(12) United States Patent
Johnson

(10) Patent No.: US 7,411,700 B2
(45) Date of Patent: Aug. 12, 2008

(54) PRINTING SYSTEM CALIBRATION

(75) Inventor: David A. Johnson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 937 days.

(21) Appl. No.: 10/695,491

(22) Filed: Oct. 28, 2003

(65) Prior Publication Data

US 2005/0088672 A1  Apr. 28, 2005

(51) Int. Cl.
*H04N 1/40* (2006.01)
(52) U.S. Cl. .................................. 358/1.9; 358/504
(58) Field of Classification Search .................. 358/1.9, 358/2.1, 504, 406, 1.15–1.16, 468
See application file for complete search history.

(56) References Cited

U.S. PATENT DOCUMENTS

| | | | |
|---|---|---|---|
| 3,995,958 A | 12/1976 | Pfahl et al. | |
| 4,286,868 A | 9/1981 | Laska | |
| 5,068,810 A | 11/1991 | Ott | |
| 5,272,518 A | 12/1993 | Vincent | |
| 5,416,613 A | 5/1995 | Rolleston et al. | |
| 5,483,360 A | 1/1996 | Rolleston et al. | |
| 5,649,073 A | 7/1997 | Knox et al. | |
| 5,739,927 A | 4/1998 | Balasubramanian | |
| 5,760,913 A | 6/1998 | Falk | |
| 5,818,960 A | 10/1998 | Gregory, Jr. et al. | |
| 5,956,469 A | 9/1999 | Liu et al. | |

*Primary Examiner*—Thomas D Lee
*Assistant Examiner*—Stephen M Brinich

(57) ABSTRACT

In an implementation of printing system calibration, a printing system includes a print unit and a calibration system. The calibration system has a learning mode operable to receive a master calibration page containing color value indicia, and measure the color value indicia to determine target color values each corresponding to a color value indicia. The calibration system can utilize a target color value to calibrate the print unit.

38 Claims, 14 Drawing Sheets

Measured Colorant Levels

Measured Color Values

Color Value

PRINTING SYSTEM CALIBRATION

TECHNICAL FIELD

This invention relates generally to color printing systems and, in particular, to printing system calibration.

BACKGROUND

Color variation in printed materials can be a major source of dissatisfaction with users of color printers. Color variation occurs when a particular color appears in a printed document at a color value that is more or less than a desired target value for that color. A major source of color variation is inconsistent and/or improper amounts of colorant present on the printed document. Current printers attempt to maintain color variation tolerances within desired thresholds for printed materials through the use of calibration systems.

Current printers are unable to consistently maintain color variation tolerances within desired thresholds in printed materials without the use of expensive and cumbersome calibration systems. Some of these systems involve manual interaction by a user of a printing device. For example, sheets of paper may need to be fed through the printing device feeder while the device generates test patterns on a printable media. Such calibration processes are disruptive and delay printing because they are normally performed between print jobs which interrupts printing performance. Such calibration techniques are also costly because sheets of paper are used to perform the closed loop calibration. Consequently, calibration processes involving manual interaction are usually performed infrequently over longer periods of time, and only after noticeable color value drifts in documents.

Other calibration processes include testing on some type of a test element, such as a transfer belt, which is internal to a printing device. Using a transfer belt to perform a calibration process, however, is prone to inaccuracies because results obtained from measuring colorant levels applied to a transfer belt may vary significantly from actual color values output by a printing device on printed material. There can be measurable differences between colorants printed on a calibration element when compared to the colorants printed on a printable media that is output by the printing device. Moreover, internal calibration processes usually rely on static parameters established at a time when a printing device is manufactured and do not account for behavior differences associated with the printing device over time. The behavior differences can be caused by many factors, such as environmental fluctuations (e.g., temperature, atmospheric pressure, humidity, etc.), different types of print media, different types of ink, and/or changes to print elements due to wear.

When identical documents are produced by more than one printer and compared to each other, there may be significant and noticeable color value variations for identical colors used to print the documents. Even identical printer models may operate differently from each other which causes them to sense and print colorants at different variations with respect to each other. Identical printer models may print different color variations because their respective components usually contain inherent operating differentials.

This is especially problematic when cluster printing which involves using a plurality of printers that operate as a single virtual printer to print multiple pages of a print job. For example, a print job request can be divided and distributed to four printers that are clustered together and which act as a single virtual printer. The virtual printer performs four times faster than each of the four printers individually and provides scalability. However, the printed output will not appear to have been produced by a single continuous printer if the colorant levels produced by each of the printers are not exactly alike. This could be especially pronounced if one of the colors used in the printed documents appears throughout the documents as a prominent feature, such as a logo. For example, the logo may appear to be cherry red on one page, yet appear to be fire red on another page.

Another problem is presented when attempting to print documents at different sites, or locations. It may be desirable for the printers to produce documents with consistent color values despite being at different locations. Currently, however, there is no reasonable and inexpensive system to ensure that the different printers produce the same printed documents with imperceptible color value variations between them.

BRIEF DESCRIPTION OF THE DRAWINGS

The same numbers are used throughout the drawings to reference like features and components.

DETAILED DESCRIPTION

Figure 1:
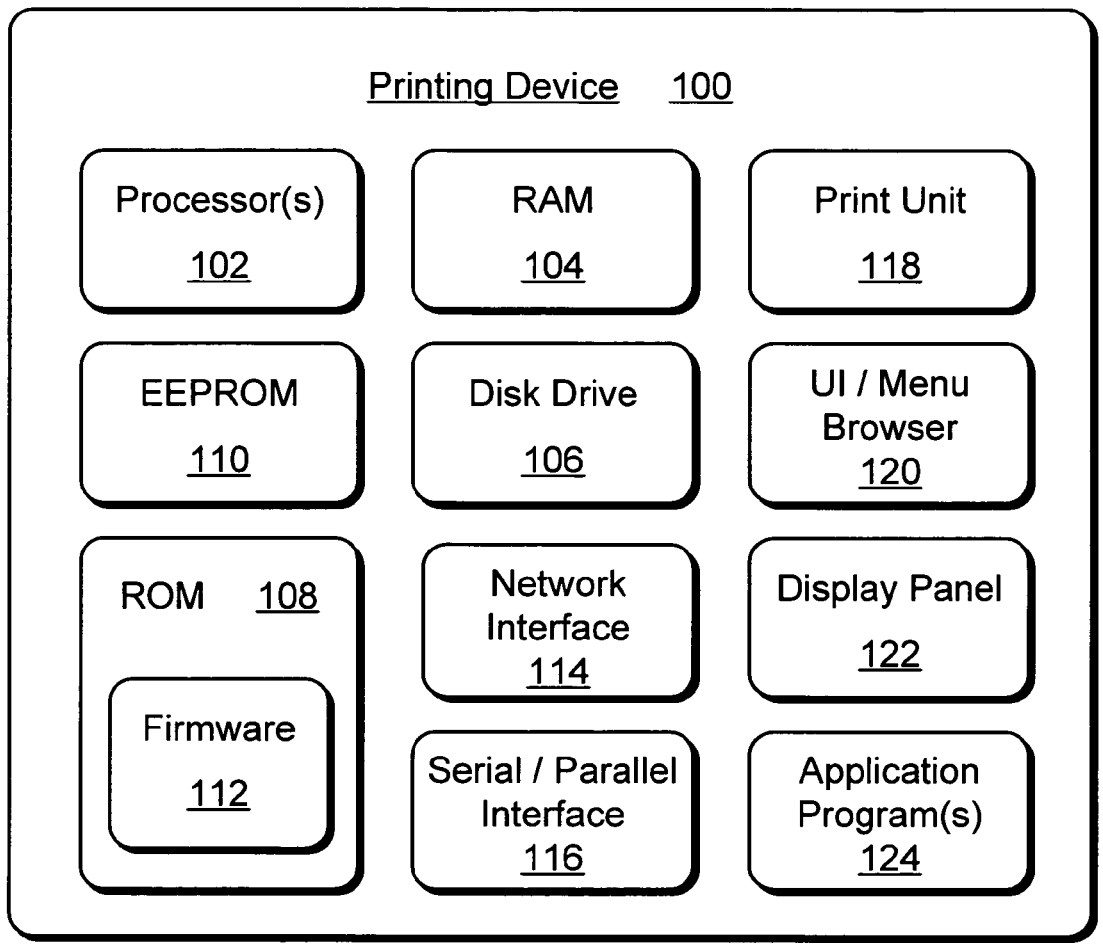
FIG. 1 illustrates various components of an exemplary printing device in which printing system calibration can be implemented.

The following describes printing system calibration. In an implementation, colorant levels of a colorant are measured when the colorant is applied to a test element. Color values of the colorant are then measured after the colorant is applied to a print media and fused, or after some other related process in which the colorant is fixed to the print media in a finished state. A correlation between the measured colorant levels (as applied to the test element) and the measured color values (as applied to the print media) is then established.

In an alternative and/or additional implementation of printing system calibration, colorant levels of a colorant are measured when the colorant is deposited on a test element. An established correlation between colorant levels and color values is used to convert the measured colorant levels to predicted color values. The established correlation may be a set during manufacture of the printing system, may be the correlation established as described above with reference to the first implementation, and/or may be established otherwise by the printing system. The predicted color values are then compared to target color values to determine whether the predicted color values are within a threshold. If not, the printing system can be recalibrated to adjust the colorant level of the colorant for printing use.

Subsequent calibrations of the printing system can be performed by utilizing only measured colorant levels of the colorant deposited on the test element without having to print a test page (e.g., a print media). These subsequent calibrations can be performed transparent to a user of the printing device when calibrating a laser printer, for example, because toner deposited onto the test element for a colorant level measurement can be cleaned off before the toner is fused or otherwise formed as a permanent image on a print media, for example. Providing that the predicted color values (as converted from the measured colorant levels) remain within a threshold level, the subsequent internal calibrations do not require printing a test print media to further calibrate the printing system.

In an alternative and/or additional implementation of printing system calibration, a master calibration page with color value indicia in a finished state may be used by the calibration system to learn which color values should appear in finished printed documents. A master calibration page can also be used to train other printers so that each printers' color values in printed documents are consistent.

As used herein, "colorant level" describes a physical quantity of a colorant at some point in a printing process prior to being produced in a finished state on a printed media. Typically, the colorant level is obtained by a sensing system that determines the mass of a colorant per unit area on some type of test medium, such as a transfer belt, a print media transport belt, pre-fused media, or other form of test media.

Further, as used herein, "color value" describes how a color appears in a finished state on a printed media. The color value can be measured by one or more devices that measure colorimetric properties with respect to how people observe colorants in a finished state. Spectrophotometers, calorimeters, densitometers, and other related devices measure the calorimetric properties to determine color values. A color value is affected by the colorant level, and may also be affected by media properties such as subtleties of how the colorant is distributed on a printed media, the surface finish of a finished document, interactions between two or more colorants that are combined to achieve a particular color value, and other factors.

FIG. 1 illustrates various components of an exemplary printing device 100 in which printing system calibration can be implemented. Printing device 100 includes one or more processors 102 (e.g., any of microprocessors, controllers, and the like) which process various instructions to control the operation of printing device 100 and to communicate with other electronic and computing devices.

Printing device 100 can be implemented with one or more memory components, examples of which include random access memory (RAM) 104, a disk drive 106, and non-volatile memory (e.g., any one or more or more of a ROM 108, flash memory, an electrically erasable programmable read-only memory (EEPROM) 110, and EPROM, etc.). The one or more memory components store various information and/or data such as configuration information, print job information and data, graphical user interface information, fonts, templates, menu structure information, and any other types of information and data related to operational aspects of printing device 100.

Printing device 100 includes a firmware component 112 that is implemented as a permanent memory module stored on ROM 108, or with other components in printing device 100, such as a component of a processor 102. Firmware 112 is programmed and distributed with printing device 100 (or separately such as in the form of an update) to coordinate operations of the hardware within the device and contains programming constructs used to perform such operations.

Printing device 100 further includes one or more communication interfaces which can be implemented as any one or more of a network interface 114, a serial and/or parallel interface 116, a wireless interface, and as any other type of communication interface. A wireless interface enables the printing device 100 to receive control input commands from an input device, such as from an infrared (IR), 802.11, Bluetooth, or similar RF input device. Network interface 114 provides a connection between printing device 100 and a data communication network which allows other electronic and computing devices coupled to a common data communication network to send print jobs, menu data, and other information to printing device 100 via the network. Similarly, the serial and/or parallel interface 116 provides a data communication path directly between printing device 100 and another electronic or computing device.

Printing device 100 also includes a print unit 118 that includes mechanisms arranged to selectively apply an imaging medium (e.g., liquid ink, liquid toner, dry toner, and the like) to print media in accordance with print data corresponding to a print job. Print media can include any form of media used for printing such as paper, plastic, fabric, Mylar, transparencies, and the like, and different sizes and types such as 8½×11, A4, roll feed media, etc. For example, print unit 118 can include an inkjet printing mechanism that selectively causes ink to be applied to a print media in a controlled fashion. The ink on the print media can then be more permanently fixed to the print media, for example, by selectively applying conductive or radiant thermal energy to the ink. There are many different types of print units available, and for the purposes of this discussion, print unit 118 can include any of these different types.

Printing device 100 also includes a user interface and menu browser 120, and a display panel 122. The user interface and menu browser 120 allows a user of the device 100 to navigate the device's menu structure. User interface 120 can include indicators or a series of buttons, switches, or other selectable controls that are manipulated by a user of the printing device. Display panel 122 is a graphical display that provides information regarding the status of printing device 100 and the current options available to a user through the menu structure.

Printing device 100 can include one or more application programs 124, such as an operating system, that can be stored in a non-volatile memory (e.g., ROM 108) and executed on processor(s) 102 to provide a runtime environment. A runtime environment facilitates extensibility of printing device 100 by allowing various interfaces to be defined that, in turn, allow the application programs 124 to interact with device 100.

Although shown separately, some of the components of printing device 100 can be implemented in an application specific integrated circuit (ASIC). Additionally, a system bus (not shown) typically connects the various components within printing device 100. A system bus can be implemented as one or more of any of several types of bus structures, including a memory bus or memory controller, a peripheral bus, an accelerated graphics port, or a local bus using any of a variety of bus architectures.

General reference is made herein to one or more printing devices, such as printing device 100. As used herein, a "printing device" means any electronic device having data communications, data storage capabilities, and/or functions to render printed characters and images on a print media. A printing device may be a fax machine, copier, plotter, and includes any type of printing device using a transferred imaging medium, such as ejected ink, to create an image on a print media. Examples of such a printing device can include, but are not limited to, laser printers, inkjet printers, plotters, portable printing devices, copy machines, network copy machines, printing systems, and multi-function or all-in-one combination devices. Although specific examples may refer to one or more of these printing devices, such examples are not meant to limit the scope of the claims or the description, but are meant to provide a specific understanding of the described implementations.

Figure 2:
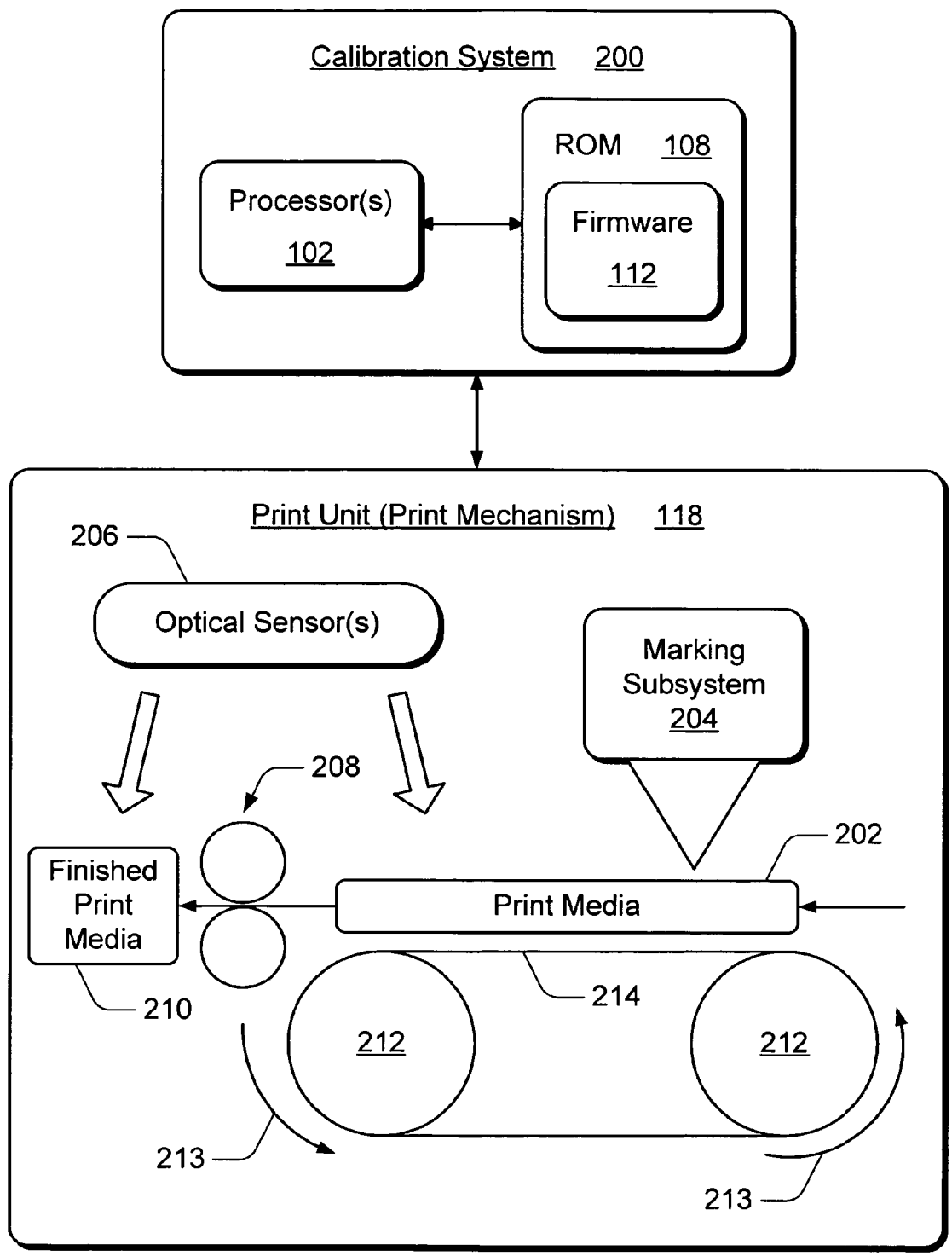
FIG. 2 illustrates exemplary printing device components including a calibration system and a print unit.

FIG. 2 illustrates various components of printing device 100, including a calibration system 200 and print unit 118. Although the print unit 118 is described as a component of a laser printer in this example, the print unit 118 can be implemented as a component of any other type of printing device as described above. Calibration system 200 performs calibration tests of print unit 118 and uses the results to calibrate the print unit. In this example, calibration system 200 includes processor(s) 102, memory (e.g., ROM 108), and firmware 112. Calibration system 200 controls calibration of the printing device 100 through the use of programmable logic and/or computer executable instructions maintained with ROM 108. Processor(s) 102 execute various instructions from ROM 108 or in the form of firmware 112 to control the operation of the printing device 100. In particular, calibration system 200 serves as a formatter to control print unit 118 and calibrations that are performed therein.

In other implementations, calibration system 200 can be implemented as any suitable hardware, firmware, software, or combination thereof. Further, a processor 102 in calibration system 200 can be implemented as any type of processing device including, but not limited to a state-machine, a Digital Signal Processor (DSP), an Application Specific Integrated Circuit (ASIC), or as one or more processor chips. Alternative types of computer-readable memory devices can be substituted for ROM 108 and/or firmware 112. Thus, the computer-executable instructions (including programmable logic) could also be stored on any alternative computer-readable media (e.g., RAM, DVD, Flash memory, etc.) including directly onto a programmable logic processor, such as a Programmable Logic Array (PLA), ASIC, and/or other programmable processing devices.

Print unit 118 generally includes the mechanical mechanisms arranged to selectively apply colorants in the form of liquid ink, liquid toner, dry toner, and the like to a print media 202 in accordance with print data corresponding to a print request. Print unit 118 includes a marking subsystem 204, one or more optical sensors 206, a fuser 208, rollers 212, and a test element 214. It is to be appreciated that print unit 118 is simplified for illustration purposes. Additional items can comprise the print unit 118 such as a motor (not shown) to drive the rollers 212. In this example, test element 214 is illustrated as a print media transport belt.

Marking subsystem 204 is used to apply a marking material (e.g., toner or ink which is a colorant of a particular color) to the print media 202 or to the test element 214. When performing calibrations, marking subsystem 204 is instructed by the calibration system 200 to print a series of half-toned test patches of one or more colorants on either the print media 202 or the test element 214. Alternatively other test patterns could be applied to either media.

Optical sensor(s) 206 can measure the colorant level of a colorant after it has been applied to the test element 214, or to the print media 202. In this example, an optical sensor 206 can be implemented as a densitometer, a calorimeter, a spectrophotometer, or as any other single or combinatory device capable of measuring the colorant level of colorants applied to a print media 202 and/or the test element 214. Alternatively, a sensor could be implemented as a non-optical mechanism capable of measuring the colorant level applied to the print media 202 and/or to the test element 214.

In this example, the single sensor 206 is positioned to sense, or otherwise measure, the colorant level of the colorant applied to the test element 214, and the color value of the colorant after being applied and formed as a permanent image on print media 210. The sensor 206 may also measure colorant levels of colorant applied to the print media 202 before passing through the fusing subsystem 208. In an event that the single sensor 206 is only able to sense colorants on the test element 214 and/or on the print media 202 prior to being formed as a permanent image, a user of the printer could be instructed to reinsert a finished page (or have the duplexer reroute a finished page twice), to ensure that the finished page passes through the entire printing unit such that sensor 206 measures the color value of the colorants after being formed as a permanent image (e.g., fused in a laser printer).

Alternatively, one sensor can be implemented to measure the colorant level of the colorant applied to the test element 214 and another sensor can be implemented to measure the color value of a colorant applied to a finished print media 210. For example, in an alternate implementation from that which is shown, a first sensor can be positioned to measure the colorant level of the colorant applied to test element 214 and also the colorant applied to the print media 202 before being formed as a permanent image. A second sensor can be positioned to measure the color value of the colorant in a finished state.

In another alternative implementation, the color value of a colorant on the finished print media 210 could be measured by a measurement device (not shown) external to printing device 100. The measured color value can then be communicated back the to the calibration system 200 for purposes of calibrating the print unit 118. This would involve transporting the finished print media 210 to the external measurement device from an output area of the printing device 100.

Fusing subsystem 208 fuses, ruptures, or melts polymeric resin in which the colorant is embedded and converts discrete toner particles into an amorphous film. This film becomes the permanent image that results in an electrophotographic copy or laser printed copy (e.g., finished print media 210). Alternatively, fusing subsystem 208 can be replaced by a liquid ink process, a chemical process, or by one or more other processes that apply colorant onto the print media 202 in a finished state.

Rollers 212 provide a mechanism for moving the test element 214 (e.g., the print media transport belt). When the rollers 212 are rotated in the direction indicated by arrows 213, the test element 214 rotates around the rollers 212 in the same direction. It is to be appreciated that the components shown in FIG. 2 are simplified and that devices such as pulleys, duplex mechanisms, clips, belts, and other related devices can be implemented in the print unit 118 to move the test element 214.

In the exemplary implementation, test element 214 is an electrostatic transport belt that permits images to be applied to the print media 202. Alternatively, test element 214 can be implemented as a photoconductive drum. When in the form of a transport belt, test element 214 may also serve to move the print media 202 through the print unit 118 from an input area (not shown) to an output area (not shown) of the printing device 100. Colorants can be applied to the test element 214 and the respective colorant levels can be measured by the sensor 206 to calibrate the print unit 118 in conjunction with other operations which are controlled by the calibration system 200, all of which shall be described in more detail below.

The calibration system 200 and the print unit 118 shown in FIG. 2 are exemplary. It is expected that various types of other print units as well as calibration system configurations can be implemented which are consistent with the techniques of the exemplary illustrations. While other specific configurations may be substituted for calibration system 200 and print unit 118, it is expected that these various configurations can be adapted to perform calibrations of printing devices in a similar fashion as described herein.

Figure 3:
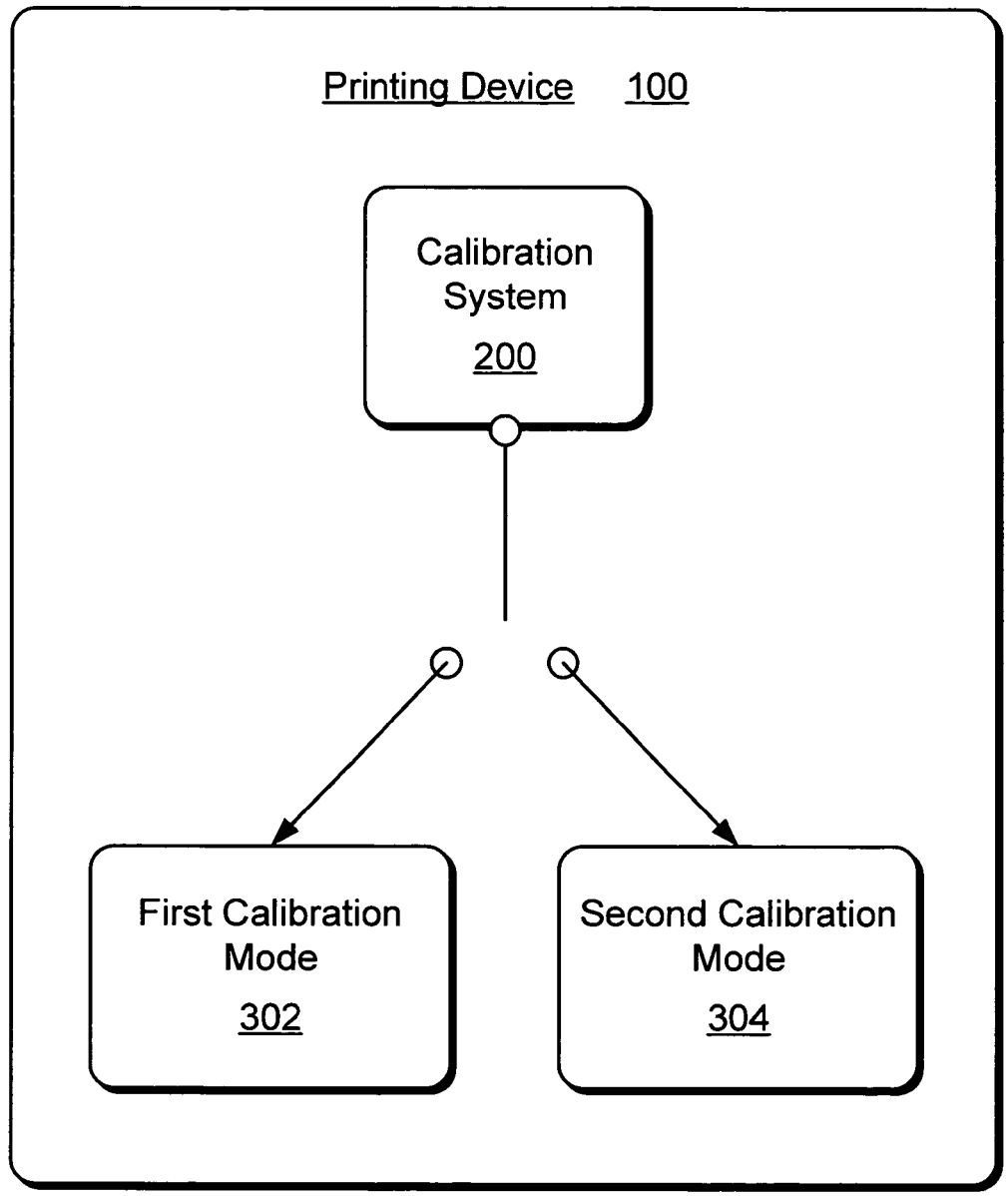
FIG. 3 illustrates a block diagram of an exemplary printing device having a calibration system that includes selectable first and second calibration modes.

FIG. 3 is a block diagram of printing device 100 having a calibration system 200 operable in a selectable one of at least a first calibration mode 302 and a second calibration mode 304. Both modes are utilized to calibrate printing device 100. In the first calibration mode 302, colorant levels of a colorant applied to a test element (e.g., a print media transport belt) are measured, an established correlation between colorant levels and color values is used to convert the measured colorant levels to predicted color values, and the predicted color values are compared to target color values to determine whether the predicted color values are within a threshold. If not, the print unit 118 can be recalibrated to adjust the colorant level of the colorant that is applied to the test element.

In the second calibration mode 304, a colorant is applied to a test element and colorant levels of the colorant are measured in a pre-fused state. The colorant may then be formed as a permanent image on the print media, and color values of the colorant in the finished state are measured. A correlation is then established between the measured colorant levels (as applied to the test element) and the measured color values (as applied to the print media). This established correlation can then be used to replace (e.g., update, revise, etc.) the established correlation in the first calibration mode 302.

Either of the calibration modes 302 and/or 304 can be selected via the user interface and menu browser 120 (FIG. 1), via a host device (not shown) in communication with the calibration system 200, or a calibration mode can be automatically scheduled depending on page usage of the printer or time scheduling. The user interface and menu browser 120, or commands sent to calibration system 200 via a host device, permits a user to select the second calibration mode 304. Alternatively, the second calibration mode can be automatically selected by the calibration system 200 according to default settings or customer preferred settings, the quantity of printed pages output by the printer for select intervals, and/or at scheduled times. Further, the second calibration mode 304 can be automatically selected when the established correlation between the measured colorant levels and the measured color values has degraded, or when irregularities are observed by the calibration system 200 in the first calibration mode 302.

Figure 4:
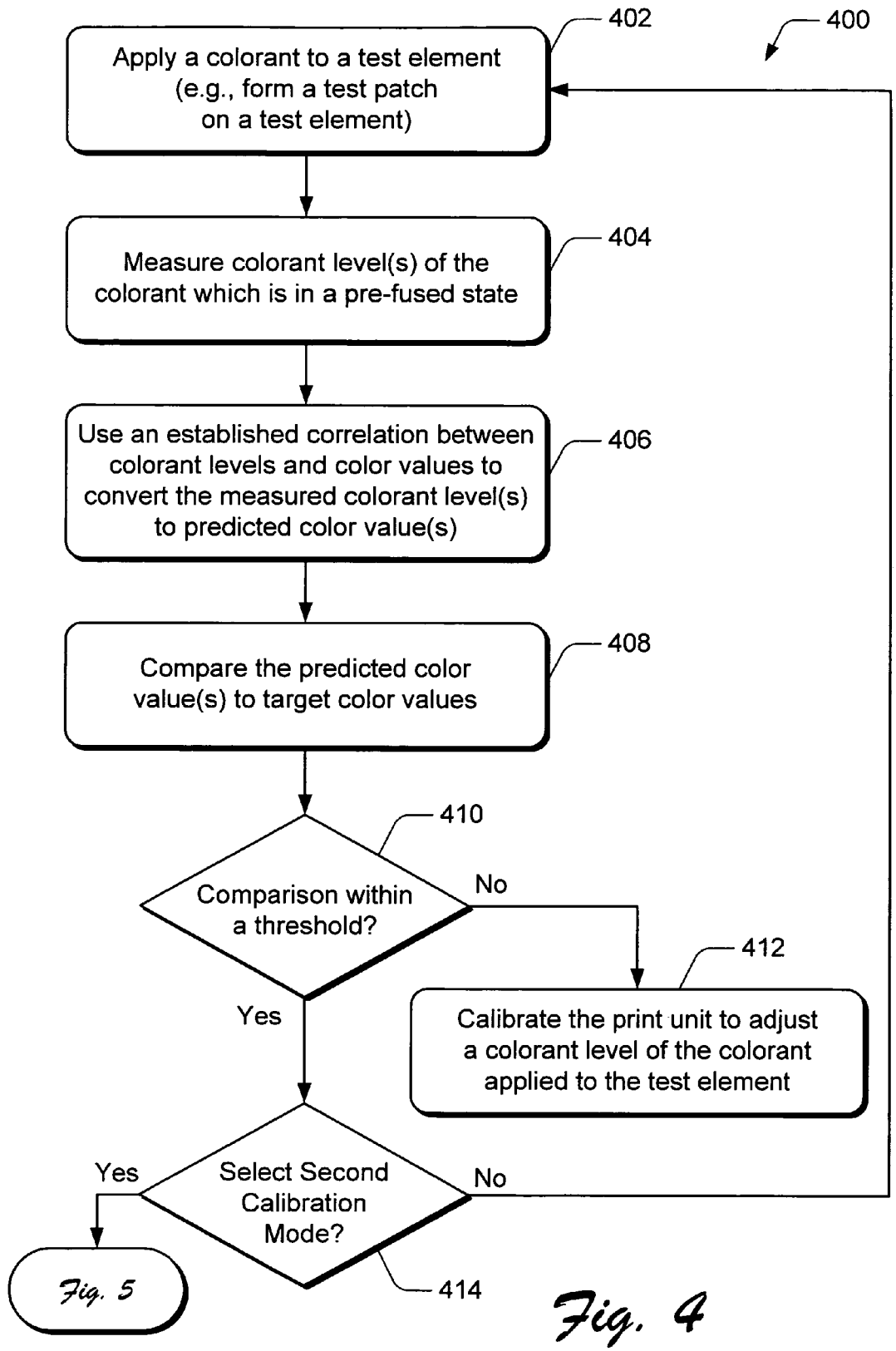
FIG. 4 is a flow diagram that illustrates an exemplary method for calibrating a printing device according to the first calibration mode.

FIG. 4 is a flow diagram that illustrates an exemplary method 400 for calibrating a printing system (e.g., the printing device 100) according to the first calibration mode 302 (FIG. 3). The order in which the method blocks are described is not intended to be construed as a limitation. Furthermore, the method 400 can be implemented in any suitable hardware, software, firmware, or combination thereof. In the exemplary implementation, method 400 is executed by the calibration system 200 in conjunction with the print unit 118 (FIG. 2).

At block 402, a colorant is applied to a test element. For example, print unit 118 can apply a colorant in the form of a colorant test patch on a test element, such as the print media transport belt 214. At block 404, colorant level(s) of the colorant applied to the test element are measured. For example, when a particular colorant is applied to a test element, the colorant level of the applied colorant is sensed, or otherwise measured, with optical sensor 206 (FIG. 2). The colorant can be applied as a series of half-toned patches or in some other format. Additionally, more than one colorant can be applied to the test element as a series of test patches spanning a range of target densities, but for purposes of simplifying this discussion, a single colorant in the form of single test patch shall be described.

At block 406, an established correlation between colorant levels and color values is used to convert the measured colorant level(s) to predicted color value(s) (i.e., if the same test patch were in a finished state on a print media). The correlation between colorant levels and color values can initially be established during manufacture of the printing device and encoded into a memory component of the calibration system 200 in the form of a value.

At block 408, the predicted color value(s) are compared to target color values (or intended color values) to determine whether the difference is greater than an acceptable threshold value established for the colorant. If the comparison is within the threshold (e.g., a difference between the predicted color value(s) and the target color values is not greater than the threshold value) (i.e., "yes" from block 410), then method 400 proceeds to block 414. If the comparison is not within the threshold (e.g., the difference between the predicted color value(s) and the target color values is greater than the maximum threshold value) (i.e., "no" from block 410), then method 400 proceeds to block 412.

At block 412, the print unit is calibrated to adjust (e.g., increase or decrease) a colorant level of the colorant applied to the test element. Alternatively, block 410 can be eliminated and the calibration system 200 can automatically recalibrate the print unit since the colorant calibration patches have already been printed and any difference between the predicted color value(s) (as converted from the measured colorant level(s)) and the target color values has been determined.

At block 414, a determination is made whether to select the second calibration mode (e.g., the calibration system 200 can determine whether to select the second calibration mode 304). If the second calibration mode 304 is not selected (i.e., "no" from block 414), then the printing device continues to periodically use the first calibration mode 302 to calibrate the print unit 118 when the calibration system 200 is initiated. However, if there is a desire to test whether the first calibration mode is accurately calibrating the printing device 100, then the second calibration mode 304 can be selected (i.e., "yes" from block 414).

Figure 5:
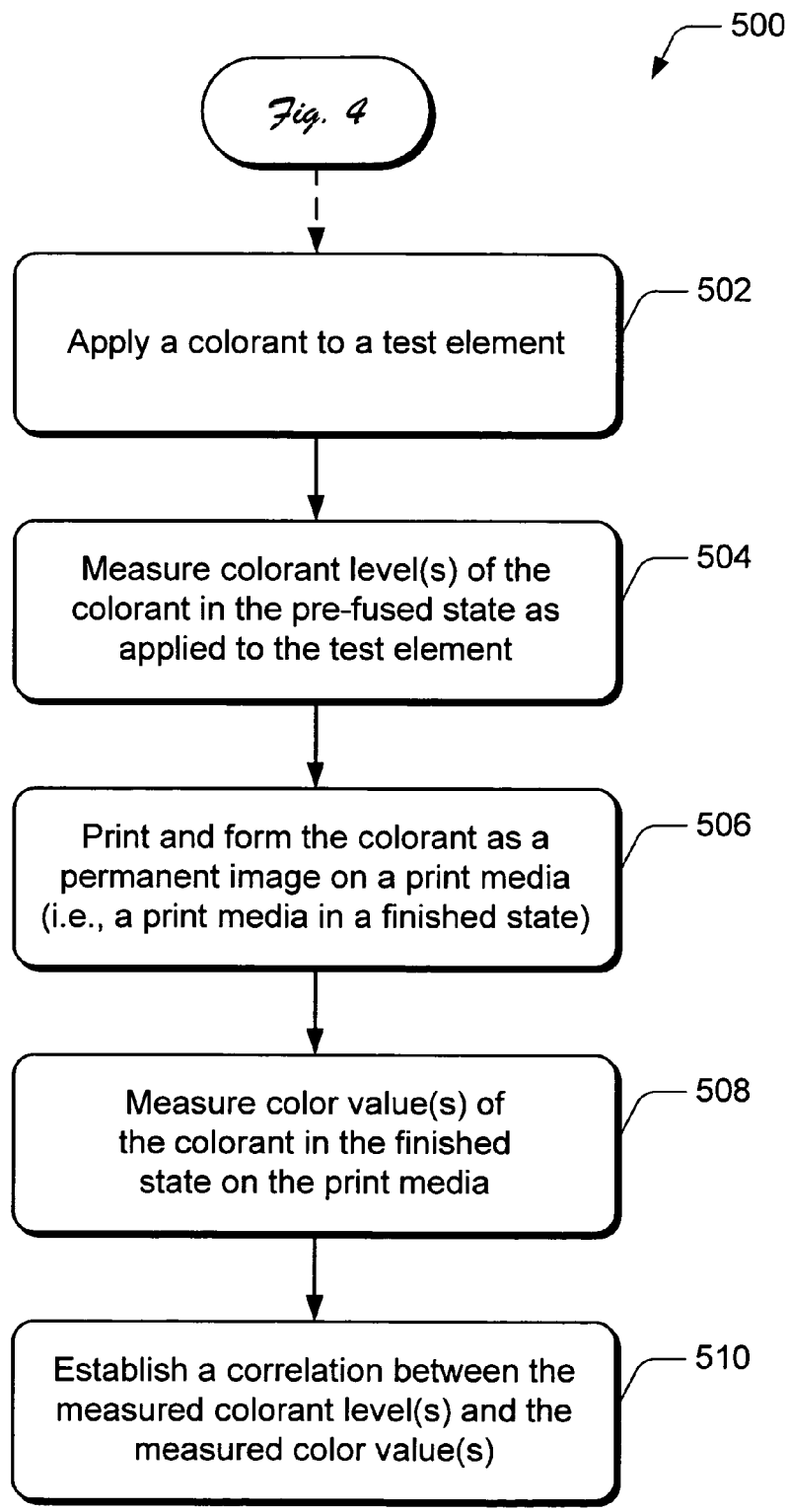
FIG. 5 is a flow diagram that illustrates an exemplary method for calibrating a printing device according to the second calibration mode.

FIG. 5 is a flow diagram that illustrates an exemplary method 500 for calibrating a printing system (e.g., the printing device 100) according to the second calibration mode 304 (FIG. 3). As described above, the second calibration mode 304 is used to establish a correlation between measured colorant level(s) and measured color value(s) such that the established correlation can be used in accordance with the first calibration mode 302 (i.e., at block 406 in FIG. 4). In an exemplary implementation, operations performed in the second calibration mode 304 are performed immediately after (although not required) measurements are completed for the first calibration mode 302 to ensure nearly identical operating conditions. The order in which the method blocks are described is not intended to be construed as a limitation. Furthermore, the method 500 can be implemented in any suitable hardware, software, firmware, or combination thereof. In the exemplary implementation, method 500 is executed by the calibration system 200 in conjunction with the print unit 118 (FIG. 2).

At block 502, a colorant is applied to a test element. For example, print unit 118 can apply the colorant as one or more test patches on a test element, such as print media transport belt 214. At block 504, colorant level(s) of the colorant applied to the test element are measured. For example, the colorant level may be sensed using the optical sensor 206 (FIG. 2).

At block 506, the colorant is printed and formed as a permanent image on a print media. The same test patches applied at block 502 are printed on a print media. At block 508, color value(s) of the colorant in the finished state are measured on the print media. This provides an accurate measurement of the color value of the colorant actually produced by the printing device 100.

At block 510, a correlation between the measured colorant level(s) and the measured color value(s) is established utilizing the colorant level measurements obtained at block 504 and the color value measurements obtained at block 508. This established correlation can then be used in the first calibration mode 302 (i.e., at block 406 in FIG. 4). For a period of time thereafter, only the pre-fused colorant level measurements from a test element need to be taken according to the first calibration mode 302 to calibrate the print unit 118. At a longer time interval, the correlation between measured colorant level(s) and measured color value(s) can be reestablished in accordance with calibration mode 304.

The second calibration mode 304 provides the advantage of making color value measurements of colorants applied to the print media in a finished state (e.g., a fused or equivalent state). Direct measurements of color values produced by colorants applied to the print media in a finished state eliminates the need to estimate what the color values would be, based on levels that are produced from measurements of colorant levels taken in a pre-fused state. These direct measurements result in tighter control over color value variations produced by a particular printing device.

Depending on the application, more than one sheet of print media can be used during calibration when the second calibration mode 304 is selected, or otherwise initiated. Additionally, the second calibration mode 304 and the first calibration mode 302 can be performed in several iterations, if necessary, to more accurately calibrate printing device 100.

While the description corresponding to FIGS. 4 and 5 describe selecting the first calibration mode 302 before the second calibration mode 304, the second calibration mode 304 can be implemented before the first calibration mode 304. Additionally, not all operations described in each block in FIGS. 4 and 5 need to be performed for each calibration process, nor must all of the blocks be conducted as one test, but can be individually performed at predetermined time intervals.

Figure 6A:
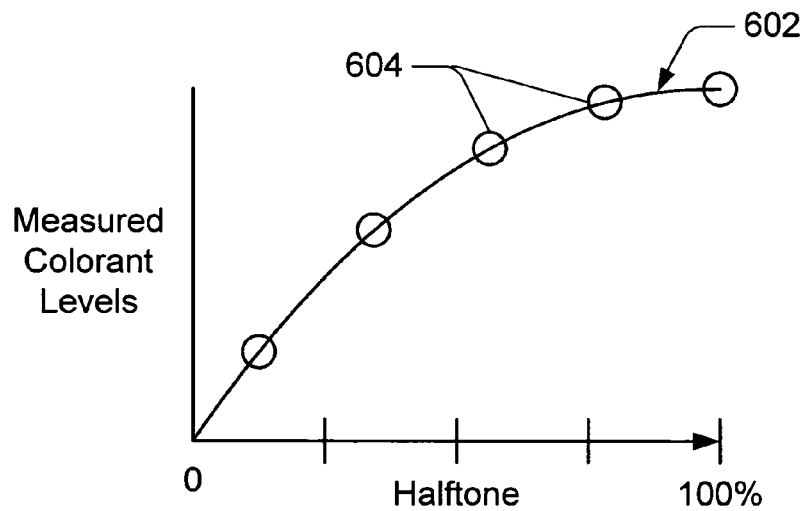
FIGS. 6A-6D illustrate an exemplary implementation of the first calibration mode.
Figure 6B:
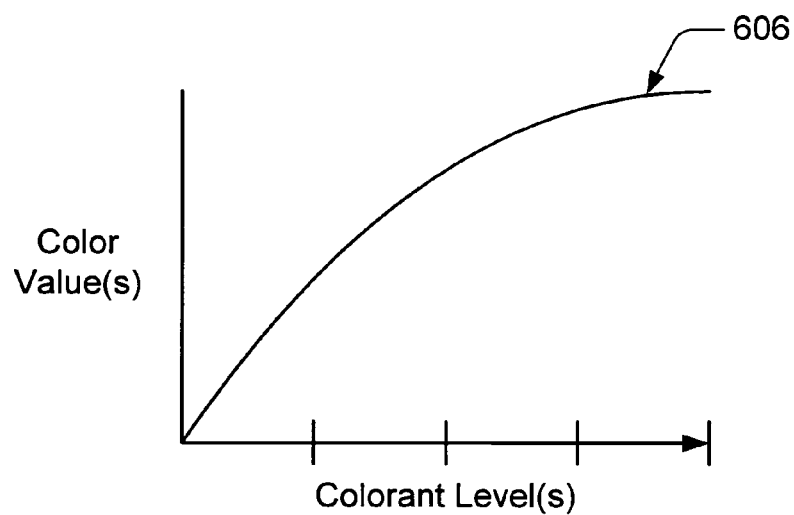

FIGS. 6A-6D illustrate an example of the first calibration mode 302 which is described with reference to method 400 (FIG. 4). In FIG. 6A, a curve fit 602 is generated that corresponds to measured colorant levels 604. For example, the colorant levels are measured when a colorant is applied to a test element and while the colorant is in a pre-fused, or not in a finished state (i.e., blocks 402 and 404 of method 400). In FIG. 6B, an established correlation 606 between colorant levels and color values is illustrated, and in FIG. 6C, the established correlation is utilized to convert the measured colorant levels 604 to predicted color values 608 along a curve fit 610 (i.e., block 406 of method 400).

The predicted color values 608 along curve fit 610 are compared to target color values along a target color value curve 612 (i.e., block 408 of method 400). The predicted color values 608 are converted from the measured colorant levels 604 (FIG. 6A) using the established correlation 606. An established correlation between colorant levels and color values is initially a static function of a printing device's characteristics which can be established when the printing device is manufactured.

Figure 6C:
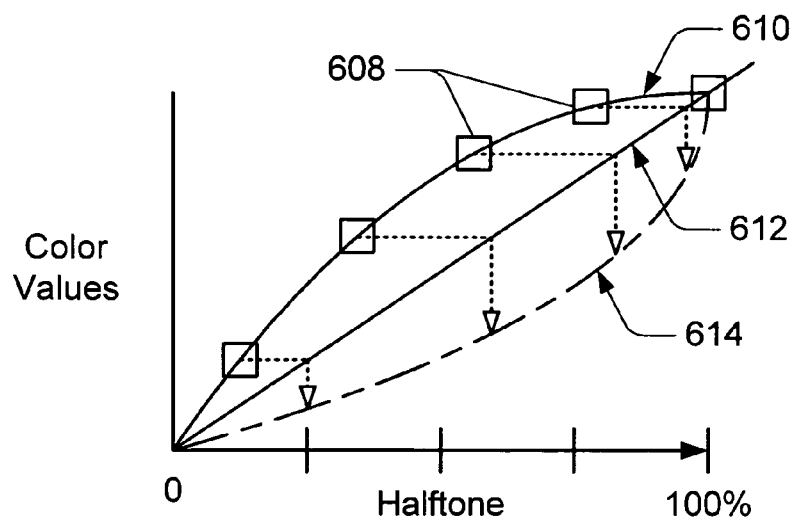
Figure 6D:
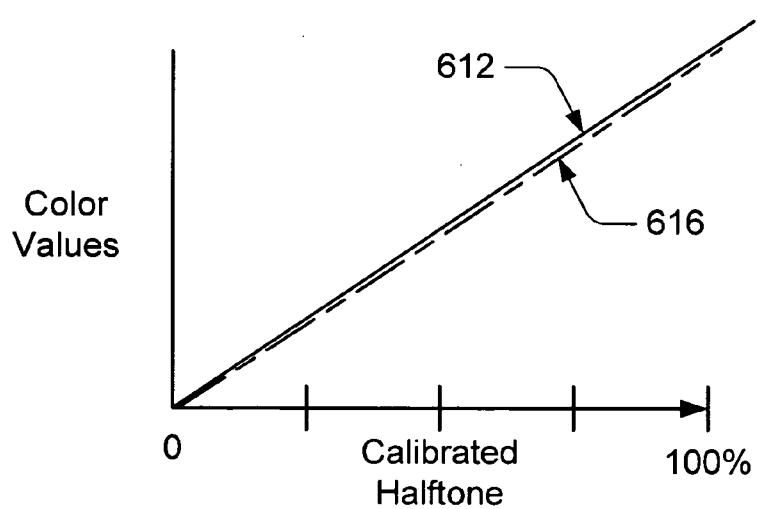

FIG. 6C also illustrates a calibrated halftone curve 614 which is an inverted curve that is generated to compensate for the displacement of the predicted color values 608 from the target color value curve 612. FIG. 6D illustrates that the calibrated halftone adjustments 614, when combined or averaged with the predicted color values 608, creates target color values along a target color value curve 616 that is substantially similar to the initial target color value curve 612 (i.e., blocks 410 and 412 of method 400).

Figure 7A:
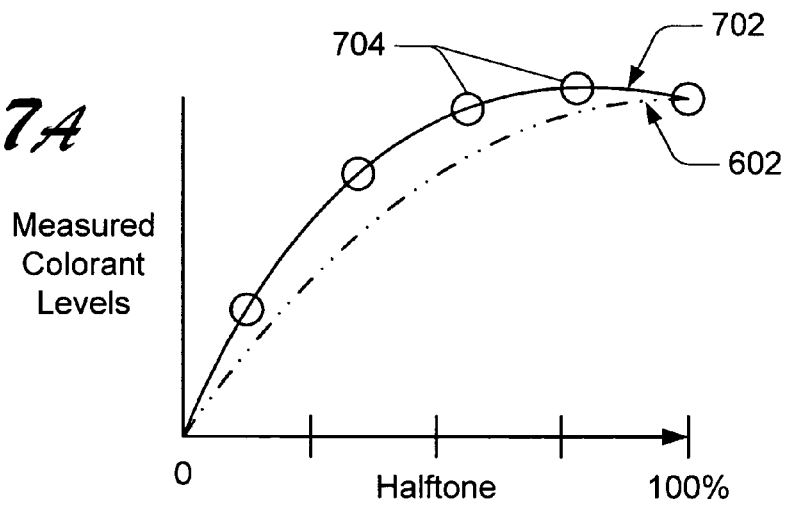
FIGS. 7A-7C further illustrate an exemplary implementation of the first calibration mode.
Figure 7B:
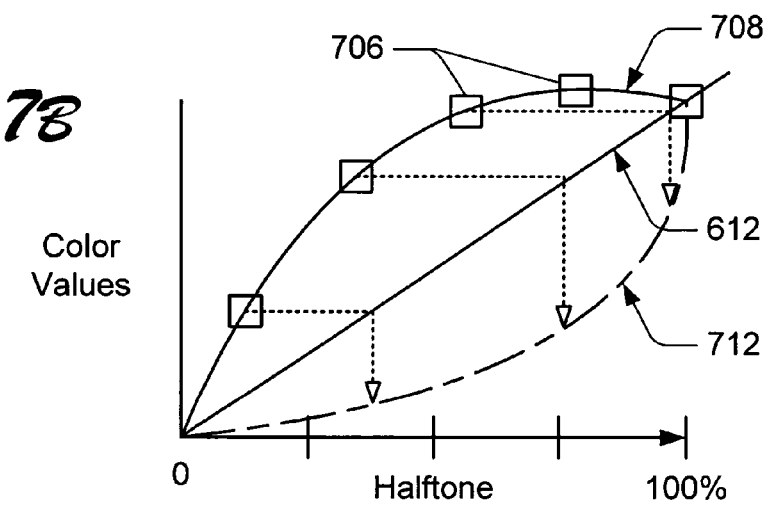
Figure 7C:
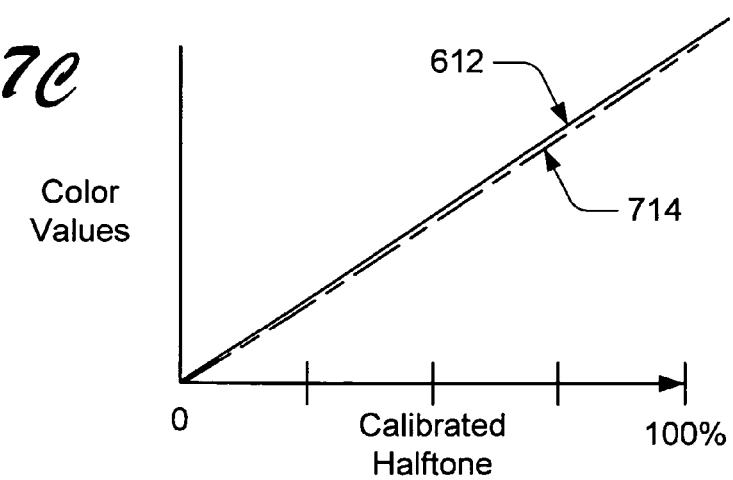

FIGS. 7A-7C further illustrate an example of the first calibration mode 302 when colorant levels are measured at a time after the calibration illustrated in FIGS. 6A-6D. In FIG. 7A, a curve fit 702 is generated that corresponds to measured colorant levels 704 which show that printing device 100 is now printing somewhat darker in the mid-tones than when colorant levels 604 were measured (i.e., comparing curve fit 702 to curve fit 602).

In FIG. 7B, the established correlation 606 (FIG. 6B) between colorant levels and color values is again utilized to convert the measured colorant levels 704 to predicted color values 706 along a curve fit 708 for comparison to the target color value curve 612. The predicted color values 706 along curve fit 708 are compared to target color values along the target color value curve 612. The predicted color values 706 are converted from the measured colorant levels 704 (FIG. 7A) using the established correlation 606 (FIG. 6B). A calibrated halftone curve 712 is generated to compensate for the displacement of the predicted color values 706 from the target color value curve 612. FIG. 7C illustrates that the calibrated halftone adjustments 712, when combined or averaged with the predicted color values 706, creates target color values along a target color value curve 714 that is substantially similar to the initial target color value curve 612.

Figure 8A:
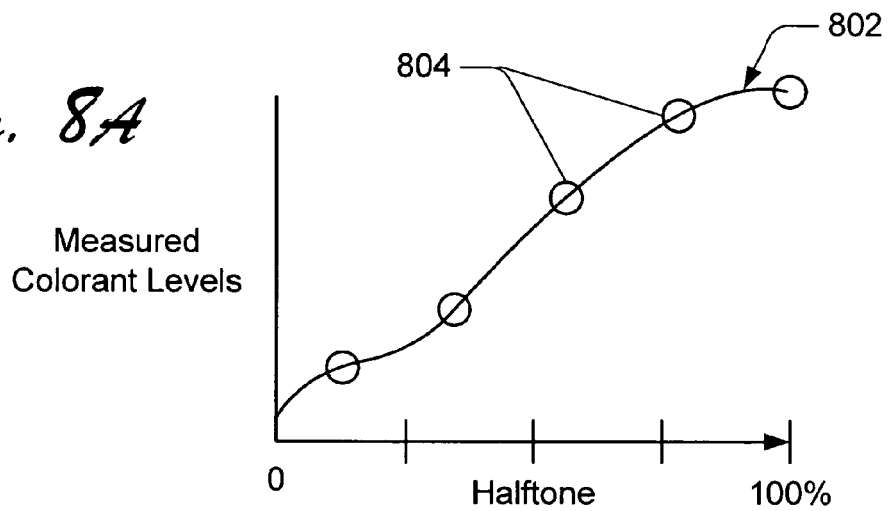
FIGS. 8A-8C illustrate an exemplary implementation of the second calibration mode.
Figure 8B:
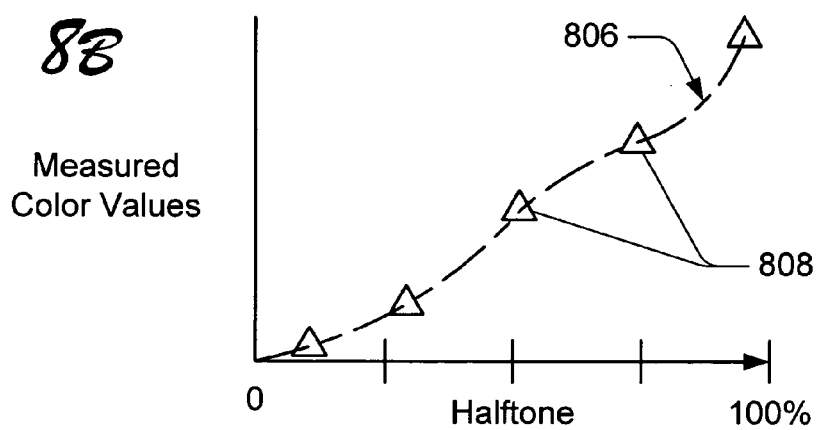
Figure 8C:
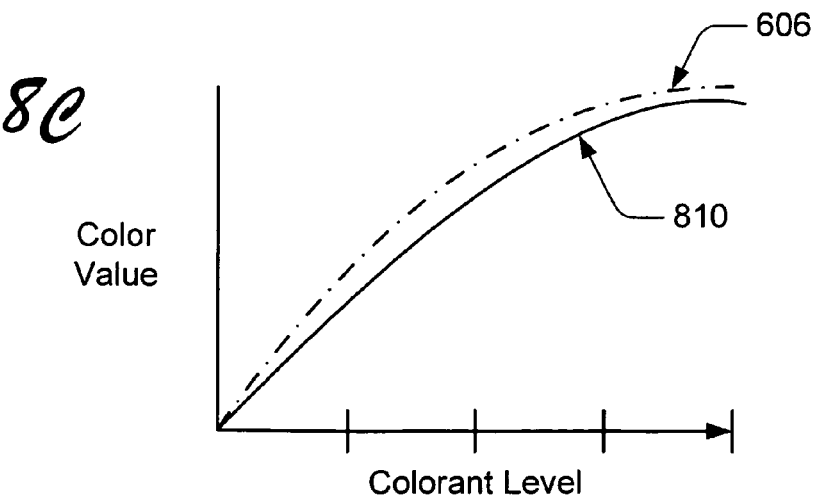

FIGS. 8A-8C illustrate an example of the second calibration mode 304 which is described with reference to method 500 (FIG. 5). In FIG. 8A, a curve fit 802 is generated that corresponds to measured colorant levels 804. For example, the colorant levels are measured when a colorant is applied to a test element and while the colorant is in a pre-fused, or not in a finished state (i.e., blocks 502 and 504 of method 500). In FIG. 8B, a curve fit 806 is generated that corresponds to measured color values 808. For example, the color values are measured after the colorant is printed and formed as a permanent image on a print media (i.e., blocks 506 and 508 of method 500).

FIG. 8C illustrates a correlation 810 that is established between the measured colorant levels 804 and the measured color values 808 (i.e., block 510 of method 500). Also shown for comparison is the correlation 606 (from FIG. 6B) that is replaced in the first calibration mode 302 with the newly established correlation 810.

The first calibration mode 302 can now be used for a period of time to control calibration of the print unit 118, instead of measuring color values of a colorant on the finished print media 210. If the accuracy of the correlation between measuring colorant levels in a pre-fused state and correlating this measurement to color values measured in a finished state degrades, a new correction factor can be reestablished by repeating the second calibration mode 304 (e.g., method 500).

Figure 9:
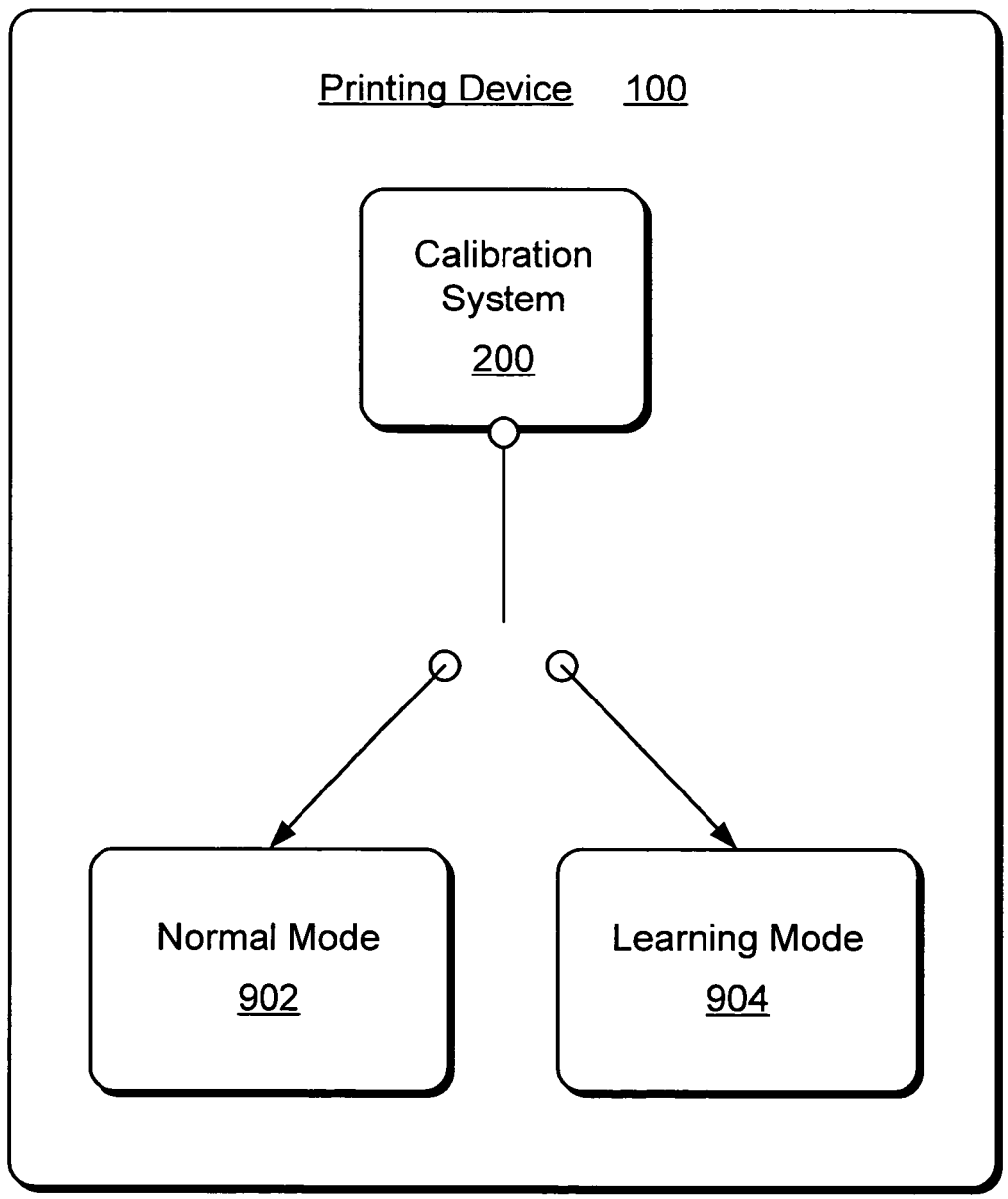
FIG. 9 illustrates a block diagram of an exemplary printing device having a calibration system that includes a selectable normal mode and a selectable learning mode.

FIG. 9 illustrates a block diagram of printing device 100 having a calibration system 200 operable in a selectable one of at least a normal mode 902 and a learning mode 904. The normal mode 902 can include any calibration process, such as the first calibration mode 302 and the second calibration mode 304 described above, either individually or in some combination.

The learning mode 904 is selected when printing device 100 is initiated to learn the target color values that can be used in accordance with the first calibration mode 302 (i.e., at block 408 in FIG. 4). When the learning mode 904 is selected, printing device 100 determines one or more target color values from a master calibration page which includes colorants in a finished state and provides a basis to consistently calibrate the color output of a particular printing device when compared to one or more other printing devices. Accordingly, a group of printing devices can be calibrated to generate the same color output (i.e., the same state relative to each other), or a group of printing devices can be calibrated to a previous state that is consistent for each of the devices. When in the learning mode 904, consistent calibration can also be achieved even when the printing devices are in different locations. This can be useful for color printer applications requiring tight control of color, or when using clusters of printing devices as one virtual printing device.

When printing device 100 learns which target color values are desired in a finished state, and when the printing device is able to match these target color values through testing, the normal mode 902 can be selected to calibrate printing device 100. When the normal mode 902 is selected, printing device 100 uses the target color values learned while in the learning mode 904 to calibrate printing device 100 according to the first calibration mode 302.

A user can select the normal mode 902 or the learning mode 904 with selectable controls on the user interface 120 (FIG. 1). Alternatively, a user can communicate calibration commands to the calibration system 200 via a host device (not shown) to enable the selection of the normal calibration mode 902 or the learning mode 904. Further, the normal calibration mode 902 and the learning mode 904 can be automatically selected by the calibration system 200 according to an indication obtained, or otherwise determined, from a master calibration page.

Figure 10:
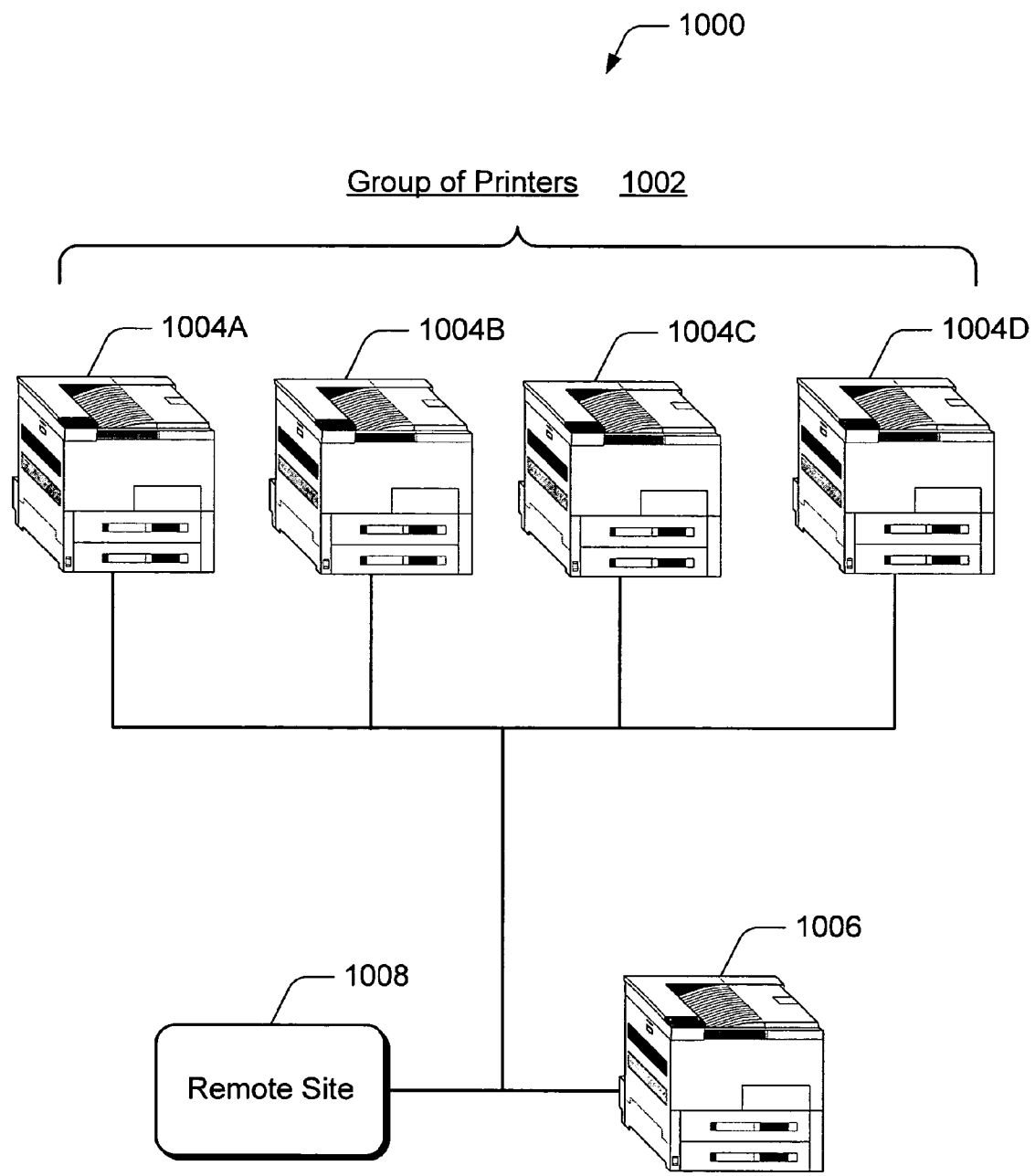
FIG. 10 illustrates an exemplary environment in which calibration is accomplished through the use of printing devices having a learning mode.

FIG. 10 illustrates an exemplary environment 1000 in which calibration is accomplished through the use of printing devices having a learning mode 904. Environment 1000 includes a group of printing devices 1002 that provide cluster printing capability. The group of printing devices 1002 includes a plurality of individual printers 1004A, 1004B, 1004C, and 1004D. Each of the individual printers 1004A, 1004B, 1004C, and 1004D may include one or more of the components of the exemplary printing device 100 shown in FIG. 1.

Cluster printing involves using the plurality of printing devices 1002 to operate as a single virtual printer. A print job request can be divided and distributed to all four printing devices 1004A, 1004B, 1004C, and 1004D, which collectively perform as the single virtual printer. The virtual printer performs four times as fast as each of the four printing devices 1004 individually and provides scalability. However, the printed output will not appear to be produced by a single continuous printer if the color images produced by each of the printing devices 1004A, 1004B, 1004C, and 1004D are not substantially similar.

Accordingly, each of the printing devices 1004A, 1004B, 1004C, and 1004D may be individually switched into the learning mode 904 and instructed to learn what the target color values should be as determined from a master calibration page. The master calibration page contains color value information, or indicia, in a finished state and provides an objective standard for each of the printing devices to learn the target color values. Each printing device operating in a learning mode 904 can measure the color values from a master calibration page and adjust it's own target color values accordingly. This compensates for any differences between color value sensors in the different printing devices. When a printing device 1004(A-D) has "learned" new target color values, they can be used in accordance with the first calibration mode 302 (i.e., at block 408 in FIG. 4) in each respective printing device.

A master calibration page (or pages) can be produced by a designated master printing device with ideal color values. For example, it is possible for one of the printing devices (e.g., 1004A) to operate as the master printer and generate the master calibration page. The other printing devices (e.g., 1004B, 1004C, and 1004D) are then slaves in this scenario and receive the master calibration page produced by the master printing device (e.g., 1004A). The learning mode 904 can be enabled individually in each of the slave printing devices (e.g., 1004B, 1004C, and 1004D) so that they learn what the target color values are from the master calibration page produced by the master printing device (e.g., 1004A in this example).

Environment 1000 can also include a remote printing device 1006 located at a remote site 1008 that is not proximate to the group of printing devices 1002. In this scenario, it is possible to ensure that remote printing device 1006 also produces printed documents with nearly identical color values as the group of printing devices 1002. In one implementation, this is accomplished by using the same master calibration page to establish target color values for all of the printers depicted in FIG. 10. Color values produced by remote printing device 1006, therefore, should be substantially similar to the color values produced by each printing device in the group of printing devices 1002.

Figure 11:
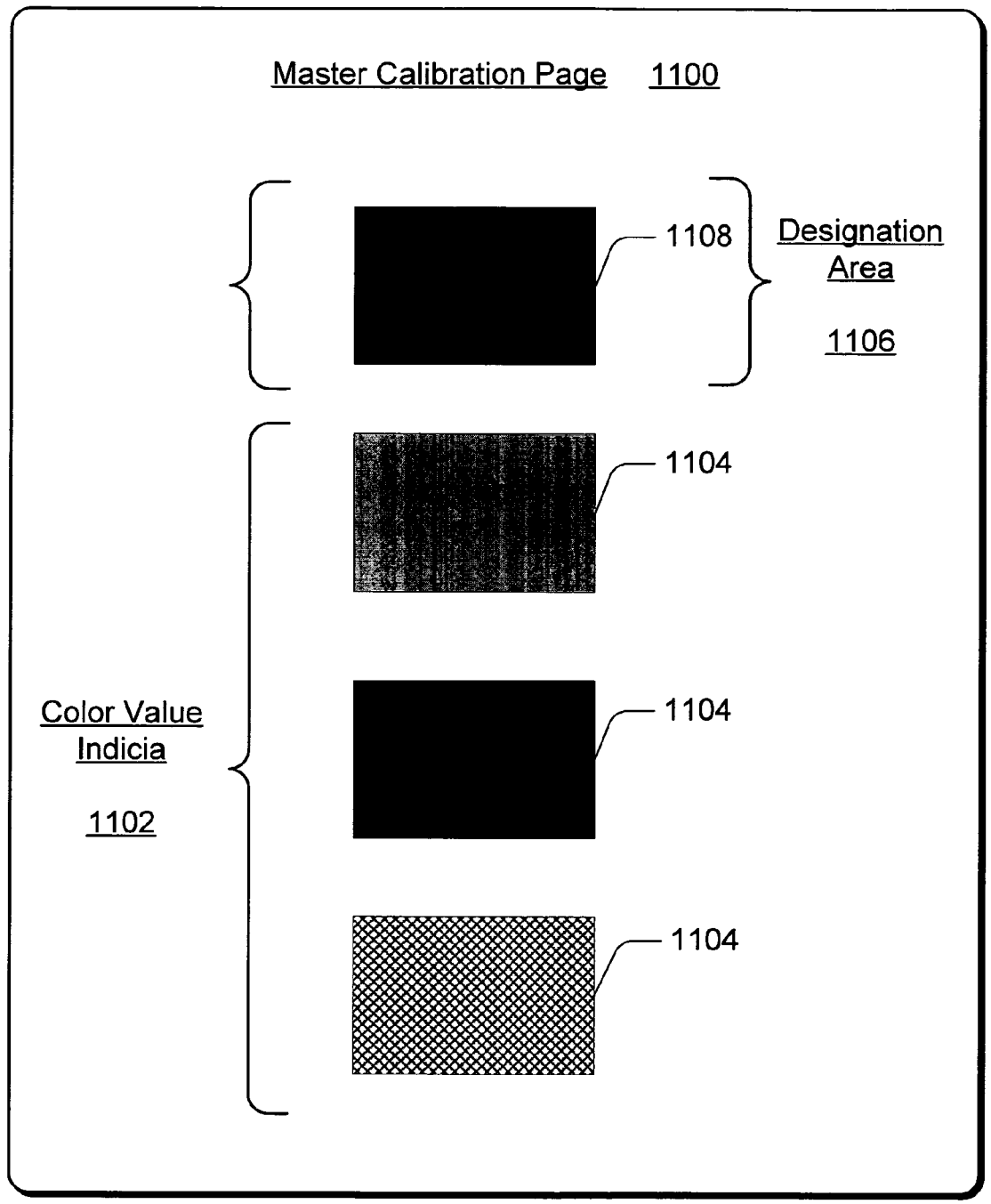
FIG. 11 illustrates an exemplary master calibration page that includes color value indicia.

FIG. 11 illustrates an exemplary master calibration page 1100 that includes color value indicia 1102 each representing a color value. In the exemplary implementation, the color value indicia 1102 are illustrated as halftone patches 1104 printed on the calibration page 1100 in a finished state (e.g., fused in a laser printer, for example). Alternatively, the color value indicia 1102 can be in the form of other shapes or in different data formats and can include more or less than the halftone patches 1104 shown in the exemplary illustration of FIG. 11.

The master calibration page 1100 also includes a designation area 1106 that enables the calibration system 200 to identify a master calibration page 1100 from a local, or non-master, calibration page. A local, or non-master, calibration page is generated when a printing device operates in the normal mode 902 (e.g., which includes the second calibration mode 304) and generates a print media in a finished state as described above with reference to FIG. 5, block 506. In the exemplary illustration, the designation area 1106 is implemented as a box 1108 in the series of half tone patches 1104. The calibration system 200 is able to identify the calibration page as a master calibration page 1100 by observing the designation area 1106. In particular, if box 1108 is colored-in or has a different density (e.g. shaded or darker) than known white areas of the master calibration page 1100, the calibration system 200 will detect the density change and determine that this is a master calibration page 1100 as opposed to a local calibration page.

There are several ways that box 1108 can designate the page as a master calibration page 1100. For example, a user may color-in box 1108 with a marker to designate page 1100 as a master calibration page. Alternatively, the calibration page may be designated as the master calibration page 1100 by requesting that a master printing device, which initially produces the master calibration page 1100, print some type of indicator (e.g., a shaded box 1108 or some other mark, text, graphic, or indicator) to designate that the page is a master calibration page 1100. Alternatively, the master calibration page 1100 can be designated as a master calibration page, as opposed to a local calibration page, by selecting buttons or keys, etc., on the user interface 120 (FIG. 1) of the printing device 100 that is being calibrated.

Figure 12:
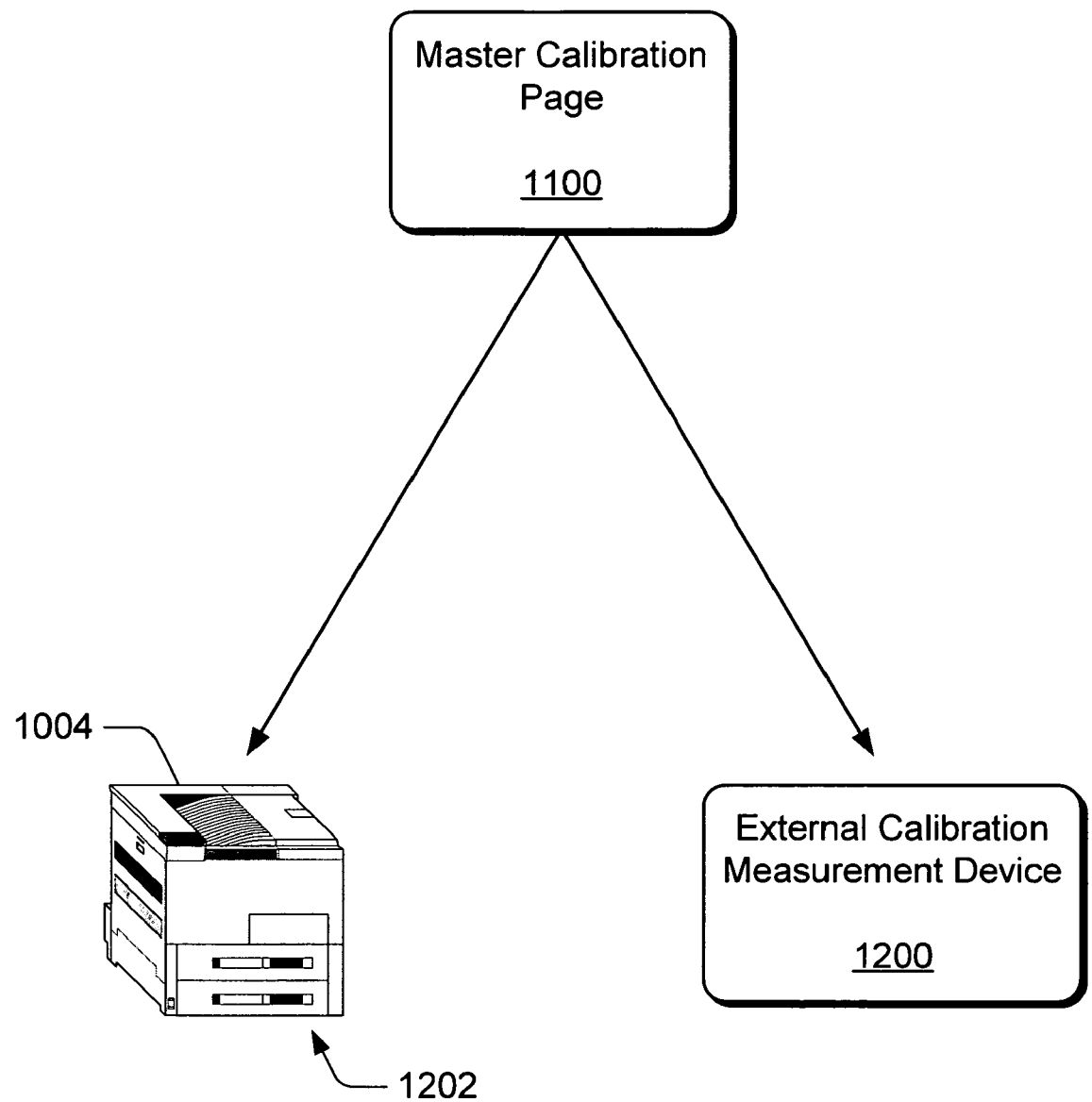
FIG. 12 illustrates a master calibration page in conjunction with a printing device and an alternative calibration system implemented as an external apparatus to the printing device.

FIG. 12 illustrates a master calibration page 1100 in conjunction with a printing device 1004 and an alternative calibration system 1200 implemented as an external calibration measurement device to the printing device 1004. In particular, master calibration page 1100 may be fed into the printing device 1004 through an input tray 1202. Alternatively, master calibration page 1100 may be fed, or otherwise inserted, into the printing device 1004 through a feeder slot (not shown).

The master calibration page 1100 can be measured by the external calibration measurement device 1200 (similar to calibration system 200 and having an optical sensor) that is external to printing device 1004. Calibration measurement device 1200 can relay, or otherwise communicate, information associated with measured color values from the master calibration page 1100 to one or more printing devices for purposes of calibrating the devices.

Figure 13:
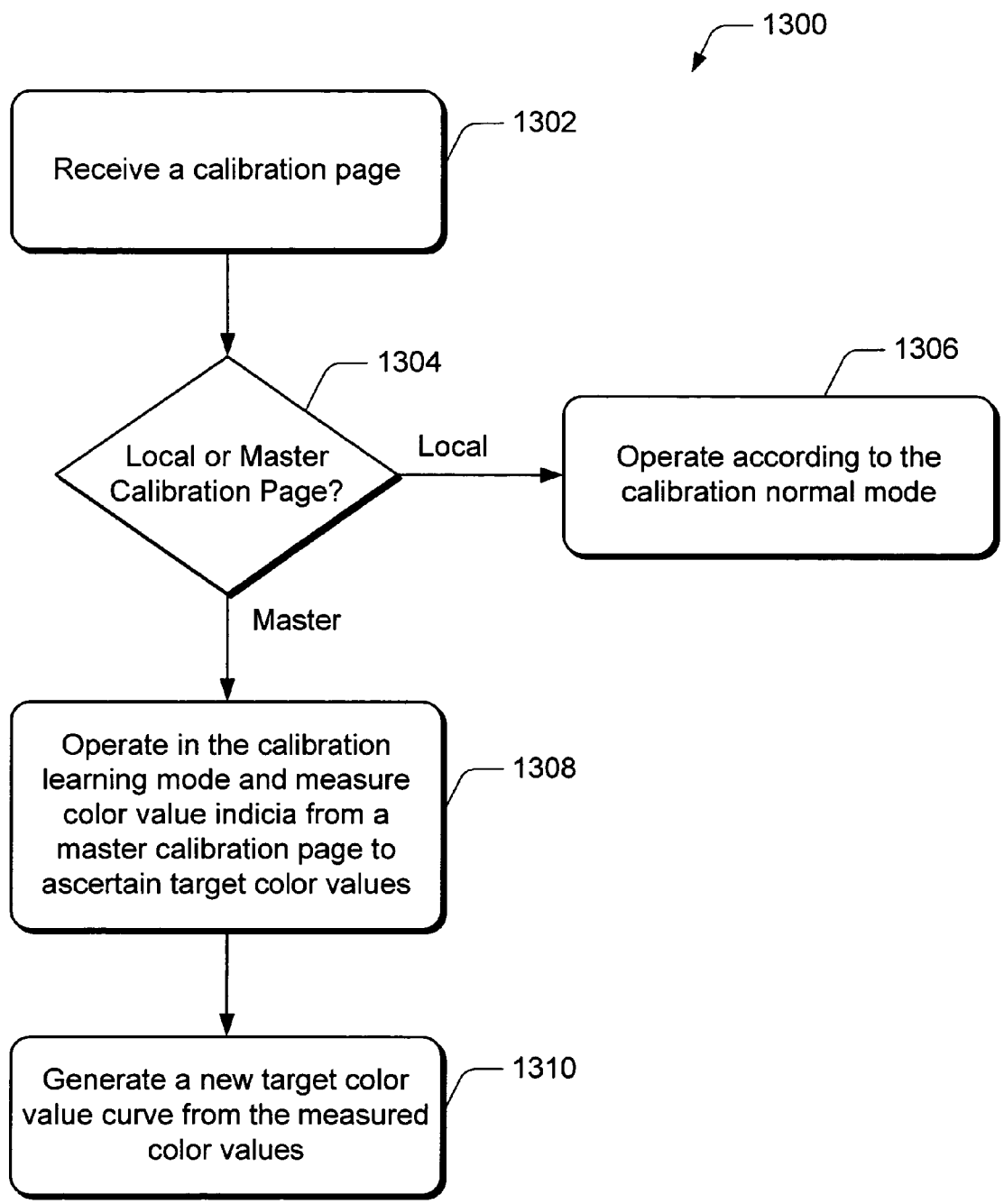
FIG. 13 is a flow diagram that illustrates an exemplary method for calibrating a printing device according to the learning mode.

FIG. 13 is a flow diagram that illustrates an exemplary method 1300 for calibrating a printing device according to the learning mode 904 (shown in FIG. 9). The order in which the method blocks are described is not intended to be construed as a limitation. Furthermore, the method 1300 can be implemented in any suitable hardware, software, firmware, or combination thereof. In the exemplary implementation, method 1300 is executed by the calibration system 200 in conjunction with the print unit 118 (FIG. 2).

At block 1302, a calibration page is received by a printing device. If the calibration page is in a finished state, the fuser of a laser printing device for example, can be turned off so as not to damage the print unit when measuring the color value indicia on the page, or so as not to otherwise alter the appearance of the calibration page.

At block 1304, a determination is made as to whether the calibration page is a master calibration page 1100 or a local calibration page, such as a print media in a finished state described with reference to FIG. 5, block 506. If the page is a local calibration page, then the normal mode 902 is selected, or otherwise initiated, and the printing device (or the external calibration measurement device 1200 shown in FIG. 12) will perform calibration(s) in accordance with the calibration normal mode 902, as shown in block 1306. If the calibration page is recognized as a master calibration page 1100 (or the learning mode 904 is selected via user interface 120), then the calibration learning mode 904 is selected and the printing device will perform calibration(s) in accordance with the learning mode 904, as shown in block 1308. As described above, the master calibration page 1100 can be fed into the printing device allowing the color value of test patches 1104 to be measured by optical sensor(s) 206.

At block 1308, the color value indicia are measured from a master calibration page to ascertain target color values. For example, calibration system 200 measures the color value indicia 1102 from master calibration page 1100 to ascertain target color values for each of the color value indicia (e.g., halftone patches 1104). The color values measured from the master calibration page are used as the target color values in accordance with the first calibration mode 302 at block 408 in FIG. 4.

At block 1310, a new target color value curve is generated from the measured color values. For example, calibration system 200 generates a new target color value curve from the color values measured at block 1308 to replace the target color value curve 612 shown in FIG. 6C. The new target color value curve can then used in the first calibration mode 302 (i.e., at block 408 in FIG. 4).

Method 1300 provides an accurate measurement of color values in a finished state on a printed document and provides an objective standard from which to calibrate one or more printing devices. Further, method 1300 can be performed for the same printing device at a later time, or by a cluster of printing devices at the same time to calibrate all of the printing devices to the same state (e.g., printing devices 1004A-D shown in FIG. 10). Several master calibration pages (e.g., master calibration page 1100) can also be printed by a master calibration printing device and distributed to slave printers for purposes of calibrating them in accordance with the master calibration pages printed by the master calibration printing device. If several master calibration pages are produced at the same time, they can be verified to be similar to each other before being distributed to slave printers, whether in clusters or at a remote site.

Although embodiments of printing system calibration have been described in language specific to structural features and/or methods, it is to be understood that the subject of the appended claims is not necessarily limited to the specific features or methods described. Rather, the specific features and methods are disclosed as exemplary implementations of printing system calibration.

The invention claimed is:

1. A printing system, comprising:
    a print unit;
    a calibration system having a learning mode operable to receive a master calibration page containing color value indicia, and further operable to measure the color value indicia to determine target color values each corresponding to a color value indicia; and
    wherein the calibration system is configured to utilize one or more of the target color values to calibrate the print unit; and
    wherein the calibration system has a normal mode that can be that can be selected as an alternative to the learning mode, the normal mode being operable to calibrate the print unit according to the one or more target color values.

2. A printing system as recited in claim 1, wherein the calibration system is further configured to generate a target color value curve from the measured color value indicia, and wherein the normal mode is operable to calibrate the print unit according to the target color value curve.

3. A printing system as recited in claim 1, further comprising:
    a first printing device that includes the print unit and the calibration system; and one or more additional printing devices each configured to (i) receive the master calibration page (ii) measure the color value indicia to determine the target color values, and (iii) utilize the target color values to calibrate a print unit of each respective printing device such that the print units are calibrated substantially similar.

4. A printing system as recited in claim 1, wherein the calibration system is further configured to identify a designation area of the master calibration page that distinguishes the master calibration page from a local calibration page.

5. A printing system as recited in claim 1, wherein the calibration system comprises one or more sensors each configured to measure the color value indicia.

6. A printing system as recited in claim 1, wherein the color value indicia are in a finished state on the master calibration page.

7. A printing system as recited in claim 1, wherein:
the print unit is a component of a printing device; and
the calibration system is external to the printing device.

8. A printing system as recited in claim 1, wherein:
the print unit is configured to apply a colorant to a test element;
the calibration system is further configured to:
measure colorant levels of the colorant applied to the test element before the colorant is in a finished state;
convert the measured colorant levels to corresponding predicted color values based on a correlation between colorant levels and color values;
compare the predicted color values to the target color values; and
calibrate the print unit if a difference between the predicted color values and the target color values exceeds a threshold value.

9. A printing system as recited in claim 8, wherein:
the print unit is further configured to apply the colorant to a print media;
the calibration system is further configured to:
measure color values of the colorant applied to the print media after the colorant is in the finished state; and
establish the correlation between the measured colorant levels and the measured color values.

10. A printing system, comprising:
a print unit;
a calibration system having a selectable one of:
a learning mode operable to receive a master calibration page containing color value indicia, and further operable to measure the color value indicia to determine target color values each corresponding to a color value indicia; and
a normal mode operable to calibrate the print unit according to one or more of the target color values;
wherein at least one of the learning mode and the normal mode is selected via a user interface.

11. A printing system as recited in claim 10, wherein the normal mode is further operable to calibrate the print unit according to preset target color values.

12. A printing system as recited in claim 10, wherein the calibration system is configured to generate a target color value curve from the measured color value indicia, and wherein the normal mode is further operable to calibrate the print unit according to the target color value curve.

13. A printing system as recited in claim 10, wherein the master calibration page contains a designation area that initiates the calibration system to select the learning mode.

14. A printing system as recited in claim 10, wherein the calibration system is operable to identify a designation area of the master calibration page that distinguishes the master calibration page from a local calibration page, and wherein the calibration system is further operable to select the learning mode when identifying the designation area of the master calibration page.

15. A printing system as recited in claim 10, further comprising:
a first printing device that includes the print unit and the calibration system; and
one or more additional printing devices each configured to (i) receive a duplicate of the master calibration page containing substantially identical color value indicia, (ii) measure the substantially identical color value indicia to determine the target color values, and (iii) utilize the target color values to calibrate a print unit of each respective printing device such that the print units are calibrated substantially similar.

16. A printing system as recited in claim 10, wherein the calibration system comprises one or more sensors each configured to measure the color value indicia.

17. A printing system as recited in claim 10, wherein the color value indicia are in a finished state on the master calibration page.

18. A printing system as recited in claim 10, wherein:
the print unit is configured to apply a colorant to a test element;
the calibration system is configured to:
measure colorant levels of the colorant applied to the test element before the colorant is in a finished state;
convert the measured colorant levels to corresponding predicted color values based on a correlation between colorant levels and color values;
compare the predicted color values to the target color values; and
calibrate the print unit if a difference between the predicted color values and the target color values exceeds a threshold value.

19. A printing system as recited in claim 10, wherein:
the print unit is further configured to apply the colorant to a print media;
the calibration system is further configured to:
measure color values of the colorant applied to the print media after the colorant is in the finished state; and
establish the correlation between the measured colorant levels and the measured color values.

20. One or more computer-readable media comprising computer-executable instructions that, when executed, direct a printing device to (i) receive a master calibration page containing color value indicia, (ii) measure the color value indicia to determine target color values each corresponding to a color value indicia, (iii) utilize one or more of the target color values to calibrate a print unit, and (iv) initiate a calibration system operable to identify a designation area of the master calibration page that distinguishes the master calibration page from a local calibration page.

21. One or more computer-readable media as recited in claim 20, further comprising computer-executable instructions that, when executed, direct the printing device to initiate a normal mode operable to calibrate the print unit according to the one or more target color values.

22. One or more computer-readable media as recited in claim 20, further comprising computer-executable instructions that, when executed, direct the printing device to initiate a learning mode to receive the master calibration page and measure the color value indicia.

23. One or more computer-readable media as recited in claim 20, further comprising computer-executable instructions that, when executed, direct the printing device to operate in conjunction with a calibration system to calibrate the print unit.

24. One or more computer-readable media as recited in claim 20, further comprising computer-executable instructions that, when executed, direct the printing device to generate a target color value curve from the measured color value indicia and calibrate the print unit according to the target color value curve.

25. One or more computer-readable media comprising computer-executable instructions that, when executed, direct a printing device to operate in a selectable one of a learning mode and a normal mode:
when in the learning mode, receive a master calibration page containing color value indicia and measure the color value indicia to determine target color values each corresponding to a color value indicia;
when in a normal mode, calibrate a print unit according to one or more of the target color values; and
direct the printing device when in the learning mode to identify a designation area of the master calibration page that distinguishes the master calibration page from a local calibration page.

26. One or more computer-readable media as recited in claim 25, further comprising computer-executable instructions that, when executed, direct the printing device to operate in conjunction with a calibration system.

27. One or more computer-readable media as recited in claim 25, further comprising computer-executable instructions that, when executed, direct the printing device when in the learning mode to generate a target color value curve from the measured color value indicia, and when in the normal mode to calibrate the print unit according to the target color value curve.

28. A method for calibrating a printing device, comprising:
receiving color value indicia;
measuring the color value indicia to determine target color values each corresponding to a color value indicia;
utilizing one or more of the target color values to calibrate the printing device; and
identifying a designation area of a master calibration page that contains the color value indicia, the designation area distinguishing the master calibration page from a local calibration page.

29. A method as recited in claim 28, wherein receiving the color value indicia includes receiving a master calibration page containing the color value indicia.

30. A method as recited in claim 28, wherein the color value indicia is received from an external calibration system that communicates the color value indicia to the printing device.

31. A method as recited in claim 28, further comprising communicating the target color values to the printing device, wherein:
an external calibration system receives a master calibration page containing the color value indicia, measures the color value indicia, and communicates the one or more target color values to the printing device; and
the printing device utilizes the one or more target color values.

32. A method as recited in claim 28, further comprising generating a target color value curve from the measured color value indicia.

33. A method as recited in claim 28, further comprising calibrating a plurality of printing devices according to the one or more target color values.

34. A method as recited in claim 28, wherein receiving the color value indicia includes receiving a master calibration page containing the color value indicia with a calibration system.

35. A method as recited in claim 28, further comprising sensing the color value indicia with one or more sensors of a calibration system to measure the color value indicia.

36. A method for calibrating a plurality of printing devices such that each of the printing devices are calibrated to generate substantially similar color values, each of the printing devices being calibrated according to the method as recited in claim 28.

37. A method for calibrating a plurality of printing devices such that each printing device is calibrated to generate substantially similar color values, each of the printing devices being calibrated according to the method as recited in claim 28, and wherein each of the printing devices receive a master calibration page containing the color value indicia.

38. A printing system, comprising:
a printing;
a calibration system having a selectable one of:
a learning mode operable to receive a master calibration page containing color value indicia, and further operable to measure the color value indicia to determine target color values each corresponding to a color value indicia; and
a normal mode operable to calibrate the print unit according to one or more of the target color values;
wherein the, master calibration page contains a designation area that initiates the calibration system to select the learning mode.

* * * * *

UNITED STATES PATENT AND TRADEMARK OFFICE
CERTIFICATE OF CORRECTION

PATENT NO. : 7,411,700 B2  Page 1 of 1
APPLICATION NO. : 10/695491
DATED : August 12, 2008
INVENTOR(S) : David A. Johnson It is certified that error appears in the above-identified patent and that said Letters Patent is hereby corrected as shown below:

In column 14, line 55, in Claim 1, delete "that can be" before "selected".

In column 18, line 37, in Claim 38, delete "printing" and insert -- print unit --, therefor.

In column 18, line 47, in Claim 38, after "wherein the" delete ",".

Signed and Sealed this

Eleventh Day of November, 2008

JON W. DUDAS
*Director of the United States Patent and Trademark Office*